(12) United States Patent
Raman et al.

(10) Patent No.: US 12,182,509 B2
(45) Date of Patent: Dec. 31, 2024

(54) PROCESSING LARGE-SCALE TEXTUAL INPUTS USING NEURAL NETWORKS (71) Applicant: Google LLC, Mountain View, CA (US)

(72) Inventors: Karthik Raman, Sunnyvale, CA (US); Liu Yang, Sunnyvale, CA (US); Mike Bendersky, Sunnyvale, CA (US); Jiecao Chen, San Jose, CA (US); Marc Alexander Najork, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 555 days.

(21) Appl. No.: 17/336,093

(22) Filed: Jun. 1, 2021

(65) Prior Publication Data

US 2021/0374345 A1 Dec. 2, 2021

Related U.S. Application Data

(60) Provisional application No. 63/032,996, filed on Jun. 1, 2020.

(51) Int. Cl.
*G06F 40/284* (2020.01)
*G06N 3/04* (2023.01)
(Continued)

(52) U.S. Cl.
CPC ........... *G06F 40/284* (2020.01); *G06N 3/04* (2013.01); *G06N 3/08* (2013.01)

(58) Field of Classification Search
CPC ........ G06F 40/284; G06F 40/28; G06F 40/30; G06F 40/40; G06F 40/44; G06F 40/216;
(Continued)

(56) References Cited

U.S. PATENT DOCUMENTS

2018/0336472 A1\* 11/2018 Ravi .................. G06N 3/08
2019/0251165 A1\* 8/2019 Bachrach ............ G06N 3/084
(Continued)

OTHER PUBLICATIONS

Zhou et al "Attention-Based Bidirectional Long Short-Term Memory Networks for Relation Classification", Proc of the 54th Annual Meeting of the Association for Computational Linguistics, pp. 207-212, Berlin, Germany, Aug. 7-12, 2016.\*
(Continued)

*Primary Examiner* — Leshui Zhang
(74) *Attorney, Agent, or Firm* — Fish & Richardson P.C.

(57) ABSTRACT

Methods, systems, and apparatus, including computer programs encoded on a computer storage medium, for performing a machine learning task on a tuple of respective input sequences to generate an output. In one aspect, one of the systems includes a neural network comprising a plurality of encoder neural networks and a head neural network, each encoder neural network configured to: receive a respective input sequence from the tuple; process the respective input sequence using one or more encoder network layers to generate an encoded representation comprising a sequence of tokens; and process each of some or all of the tokens in the sequence of tokens using a projection layer to generate a lower-dimensional representation, and the head neural network configured to: receive lower-dimensional representations of a respective proper subset of the sequence of tokens generated by the encoder neural network; and process the lower-dimensional representations to generate the output.

20 Claims, 3 Drawing Sheets

(51) Int. Cl.
*G06N 3/045* (2023.01)
*G06N 3/08* (2023.01)

(58) Field of Classification Search
CPC ...... G06F 40/295; G06F 40/58; G06F 40/126;
G06F 40/205; G06F 16/345; G06N 3/006;
G06N 3/04; G06N 3/08; G06N 3/042;
G06N 3/044; G06N 3/045; G06N 3/084;
G10L 15/16
USPC ........................................................ 704/1–9
See application file for complete search history.

(56) References Cited

U.S. PATENT DOCUMENTS

2019/0355270 A1* 11/2019 McCann ........... G06F 16/90332
2020/0034436 A1* 1/2020 Chen ........................ G06N 3/08

OTHER PUBLICATIONS

Berg-Kirkpatrick et al., "An empirical investigation of statistical significance in nlp," Proceedings of the 2012 Joint Conference on Empirical Methods in Natural Language Processing and Computational Natural Language Learning, Jeju Island, Korea, Jul. 12-24, Jul. 2012, 996-1005.
Bowman et al., "A large annotated corpus for learning natural language inference," arXiv, Aug. 2015, 11 pages.
Cer et al., "Universal Sentence Encoder for English," Proceedings of the 2018 Conference on Empirical Methods in Natural Language Processing: System Demonstrations, Brussels, Belgium, Oct. 31-Nov. 4, 2018, Nov. 2018, 169-174.
Chidambaram et al., " Learning cross-lingual sentence representations via a multi-task dual-encoder model," arXiv, Oct. 2018, 10 pages.
Clark et al., "Electra: Pre-training text encoders as discriminators rather than generators," arXiv, Mar. 2020, 18 pages.
Das et al., "Together we stand: Siamese networks for similar question retrieval," Proceedings of the 54th Annual Meeting of the Association for Computational Linguistics, Berlin, Germany, Aug. 7-12, 2016, Aug. 2016, 1:378-387.
Devlin et al., "Bert: Pre-training of deep bidirectional transformers for language understanding," arXiv, Oct. 2018, 16 pages.
Frankle et al., "The lottery ticket hypothesis: finding sparse, trainable neural networks," arXiv, Mar. 2019, 42 pages.
Guo et al., "A deep look into neural ranking models for information retrieval," Information Processing & Management, Nov. 2020, 57(6):1-61.
Guo et al., "A deep relevance matching model for ad-hoc retrieval," Proceedings of the 25th ACM International on Conference on Information and Knowledge Management, Indianapolis, IN, USA, Oct. 24-28, 2016, Oct. 2016, 55-64.
Henderson et al., "Efficient natural language response suggestion for smart reply," arXiv, May 2017, 15 pages.
Hinton et al., "Distilling the knowledge in a neural network," arXiv, Mar. 2015, 9 pages.
Howard et al., "Mobilenets: Efficient convolutional neural networks for mobile vision applications," arXiv, Apr. 2017, 9 pages.
Hu et al., "Convolutional neural network architectures for matching natural language sentences," Advances in Neural Information Processing Systems, 2014, 9 pages.
Huang et al., "Learning deep structured semantic models for web search using click through data," Proceedings of the 22nd ACM International Conference on Information & Knowledge Management, San Francisco, CA, USA, Oct. 27, 2013, Oct. 2013, 2333-2338.
Humeau et al., "Poly-encoders: Transformer architectures and pre-training strategies for fast and accurate multi-sentence scoring," arXiv, Apr. 2019, 14 pages.
Iandola et al., "SqueezeNet: AlexNet-level accuracy with 50x fewer parameters and< 0.5 MB model size," arXiv, Feb. 2016, 13 pages.
Jiao et al., "Tinybert: Distilling bert for natural language understanding," arXiv, Sep. 2019, 12 pages.
Johnson et al., "Billion-scale similarity search with gpus," IEEE Transactions on Big Data, Jun. 2019, 12 pages.
Lan et al., "Albert: A lite bert for self-supervised learning of language representations," arXiv, Sep. 2019, 17 pages.
Li et al., "Semantic Matching in Search," Foundations and Trends in Information Retrieval, 2014, 7(5):343-469.
Liu et al., "RoBERTa: A robustly optimized BERT pretraining approach," arXiv, Jul. 2019, 13 pages.
MacAvaney et al., "Efficient document re-ranking for transformers by precomputing term representations," Proceedings of the 43rd International ACM SIGIR Conference on Research and Development in Information Retrieval, Xi'an, China, Jul. 25-30, 2020, Jul. 2020, 10 pages.
Mitra et al., "Learning to match using local and distributed representations of text for web search," Proceedings of the 26th International Conference on World Wide Web, Perth, Australia, Apr. 3-7, 2017, Apr. 2017, 9 pages.
Pang et al., "Text matching as image recognition," Proceedings of the AAAI Conference on Artificial Intelligence, Phoenix, Arizona, USA, Feb. 12-17, 2016, Mar. 2016, 30(1):1-7.
Peters et al., "Deep contextualized word representations," arXiv, Feb. 2018, 15 pages.
Rao et al., "Bridging the gap between relevance matching and semantic matching for short text similarity modeling," Proceedings of the 2019 Conference on Empirical Methods in Natural Language Processing and the 9th International Joint Conference on Natural Language Processing, Hong Kong, China, Nov. 3-7, 2019, Nov. 2019, 5370-5381.
Reimers et al., "Sentence-BERT: Sentence embeddings using siamese bert-networks," arXiv, Aug. 2019, 11 pages.
Renda et al., "Comparing rewinding and fine-tuning in neural network pruning," arXiv, Mar. 2020, 31 pages.
Sanh et al., "DistilBERT, a distilled version of BERT: smaller, faster, cheaper and lighter," arXiv, Oct. 2019, 5 pages.
Sun et al., "Patient knowledge distillation for BERT model compression," arXiv, Aug. 2019, 10 pages.
Tang et al., "Distilling task-specific knowledge from BERT into simple neural networks," arXiv, Mar. 2019, 8 pages.
Turc et al., "Well-read students learn better: On the importance of pre-training compact models," arXiv, Aug. 2019, 13 pages.
Vaswani et al., "Attention is all you need," arXiv, Jun. 2017, 15 pages.
Wang et al., "A compare-aggregate model for matching text sequences," arXiv, Nov. 2016, 11 pages.
Wang et al., "To tune or not to tune? How about the best of both worlds?," arXiv, Jul. 2019, 7 pages.
Xiong et al., "End-to-end neural ad-hoc ranking with kernel pooling," Proceedings of the 40th International ACM SIGIR Conference on Research and Development in Information Retrieval, Shinjuku, Tokyo, Japan, Aug. 7-11, 2017, Aug. 2017, 55-64.
Yang et al., "aNMM: Ranking short answer texts with attention-based neural matching model," Proceedings of the 25th ACM International on Conference on Information and Knowledge Management, Indianapolis, Indiana, USA, Oct. 24-28, 2016, Oct. 2016, 287-296.
Yang et al., "Multilingual universal sentence encoder for semantic retrieval," arXiv, Jul. 2019, 6 pages.
Han et al., "Deep compression: Compressing deep neural network with pruning, trained quantization and huffman coding," International Conference on Learning Representations, San Juan, Puerto Rico, May 2-4, 2016, May 2016, 1-14.

* cited by examiner

PROCESSING LARGE-SCALE TEXTUAL INPUTS USING NEURAL NETWORKS

CROSS-REFERENCE TO RELATED APPLICATION

This application claims the benefit of the filing date of U.S. Application No. 63/032,996, filed on Jun. 1, 2020. The disclosure of the prior application is considered part of and is incorporated by reference in the disclosure of this application.

BACKGROUND

This specification relates to performing a machine learning task on a tuple of input sequences using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that implements and trains a neural network to perform a machine learning task on a received tuple of input sequences. Each input sequence in turn has a respective network input at each of a plurality of input positions in an input order. Different input sequences can have different numbers of network inputs. Depending on the specifics of different machine learning tasks, the neural network can be configured to generate any kind of score, classification, or regression output based on the input.

For example, the neural network can be configured to perform a text processing task, e.g., to receive an input that includes multiple text sequences that are from one or more text documents and to process the input to generate an output for the text processing task. For example, the text processing task can be a semantic text matching task, a machine reading comprehension task, a question answering task, a passage ranking task, or a key phrase extraction task.

For example, each input to the neural network can be a tuple of two input sequences, where a first input sequence specifies Internet resources (e.g., web pages), documents, or portions of documents and a second input sequence specifies a set of one or more words or phrases (e.g., key words, key terms, or concepts), and the output generated by the neural network for a given input tuple may be a score for the set of the one or more words or phrases, with the score representing an estimated relevance of the set of word or phrase with respect to the Internet resource, document, or document portion.

As another example, each input to the neural network can be a tuple of two input sequences, where a first input sequence specifies a question (e.g., a question query issued to a search engine) and a second input sequence specifies a set of one or more text segments (e.g., Internet resources (e.g., web pages), documents, or portions of documents), and the output generated by the neural network for a given input may be a score for the set of the one or more text segments, with the score representing an estimated likelihood that the set of one or more text segments includes content that provides an answer to the question.

According to an aspect, there is provided a computer-implemented method comprising receiving, at each of a plurality of encoder neural networks, a respective input sequence from a tuple of respective input sequences; processing, using one or more encoder network layers of each of the plurality of encoder neural networks, the respective input sequence to generate an encoded representation of the respective input sequence, the encoded representation comprising a sequence of tokens; processing, using a projection layer of each of the plurality of encoder neural networks, each of some or all of the tokens in the sequence of tokens to generate a lower-dimensional representation of the token; receiving, at a head neural network and from each of the plurality of encoder neural networks, lower-dimensional representations of a respective proper subset of the sequence of tokens generated by the encoder neural network; and processing, using the head neural network, the lower-dimensional representations to generate an output.

The head neural network may be further configured to access the lower-dimensional representations of the respective proper subsets of the sequences of tokens generated by the encoder neural networks from a memory.

The lower-dimensional representations of the tokens generated by different projection layers may have different dimensions from each other.

Each input sequence may have a respective network input at each of a plurality of input positions in an input order.

The sequence of tokens generated by the encoder neural network may comprise a corresponding token for each network input in the input sequence.

The method may further comprise, for each sequence of tokens generated by the one or more encoder network layers of the encoder neural network from the input sequence: determining the respective proper subset of the sequence of tokens based on respective positions of the tokens in the sequence and on a length of the input sequence.

The respective proper subset of the sequence of tokens may comprise first N tokens in the sequence of tokens, and wherein N is a predetermined positive integer.

The one or more encoder network layers may comprise an attention layer that is configured to: receive an input sequence for the layer comprising a respective layer input at each of one or more positions; and generate an attended input sequence at least in part by applying an attention mechanism to the input sequence for the layer, the attended input sequence comprising a respective attended layer input at each of the one or more positions.

The machine learning task may be a semantic text matching task.

The method may further comprise training the plurality of encoder neural networks and the head neural network including initializing parameter values of the one or more encoder network layers of each encoder neural network with a predetermined set of parameter values.

The training may further comprise: receiving a training tuple; processing the training tuple using a trained neural network to generate a teacher network output; and training the neural network using the teacher network output generated by the trained neural network, wherein the training comprises adjusting only parameter values of the projection layers of the encoder neural networks and parameter values of the head neural network.

The training may further comprise: receiving another training tuple; processing the training tuple using the trained neural network to generate another teacher network output;

and training the neural network using the other teacher network output generated by the trained neural network, including adjusting parameter values of the one or more encoder network layers of the encoder neural networks.

According to another aspect, there is provided a system comprising one or more computers and one or more storage devices storing instructions that are operable, when executed by the one or more computers, to cause the one or more computers to perform the operations of the above method aspect.

According to a further aspect, there is provided a computer storage medium encoded with instructions that, when executed by one or more computers, cause the one or more computers to perform the operations of the method aspect.

It will be appreciated that features described in the context of one aspect may be combined with features described in the context of another aspect.

Particular embodiments of the subject matter described in this specification can be implemented so as to realize one or more of the following advantages.

The described techniques allow for a system to implement a neural network with a flexible and adaptive architecture that is scalable for processing long-range input sequences. In particular, by implementing different numbers of encoder neural networks that are each configured to process a respective input sequence in parallel with each other, the system can use the neural network to process an arbitrary number of input sequences each of an arbitrary length and thereby endow the neural network with the capability of effectively performing any of a variety of appropriate machine learning tasks that involve operating on large-scale textual inputs, data derived from large-scale textual inputs, or both.

The described techniques also allow for the system to process the inputs in a data efficient, and, therefore, computing resource efficient manner. Specifically, by identifying proper subsets of respective sequences of output tokens generated by the encoder neural networks and by making use of encoder-specific projection layers, the system can generate compact representations of the inputs to provide to a head neural network for generating high-quality network outputs with minimum loss of representational capacity of the information contained within the original inputs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that implements and trains a neural network to perform a machine learning task on a tuple of input sequences. Each input sequence in turn has a respective network input at each of a plurality of input positions in an input order. Different input sequences can have different numbers of network inputs. Depending on the specifics of different machine learning tasks, the neural network can be configured to generate any kind of score, classification, or regression output based on the tuple of input sequences.

For example, the neural network can be configured to perform a text processing task, e.g., to receive an input that includes multiple text sequences that are from one or more text documents and to process the input to generate an output for the text processing task. For example, the text processing task can be a semantic text matching task, a machine reading comprehension task, a question answering task, a passage ranking task, or a key phrase extraction task.

For example, each input to the neural network can be a tuple of two input sequences, where a first input sequence specifies Internet resources (e.g., web pages), documents, or portions of documents and a second input sequence specifies a set of one or more words or phrases (e.g., key words, key terms, or concepts), and the output generated by the neural network for a given input tuple may be a score for the set of the one or more words or phrases, with the score representing an estimated relevance of the set of word or phrase with respect to the Internet resource, document, or document portion.

As another example, each input to the neural network be a tuple of two input sequences, where a first input sequence specifies a question (e.g., a question query issued to a search engine) and a second input sequence specifies a set of one or more text segments (e.g., Internet resources (e.g., web pages), documents, or portions of documents), and the output generated by the neural network for a given input may be a score for the set of the one or more text segments, with the score representing an estimated likelihood that the set of one or more text segments includes content that provides an answer to the question.

Figure 1:
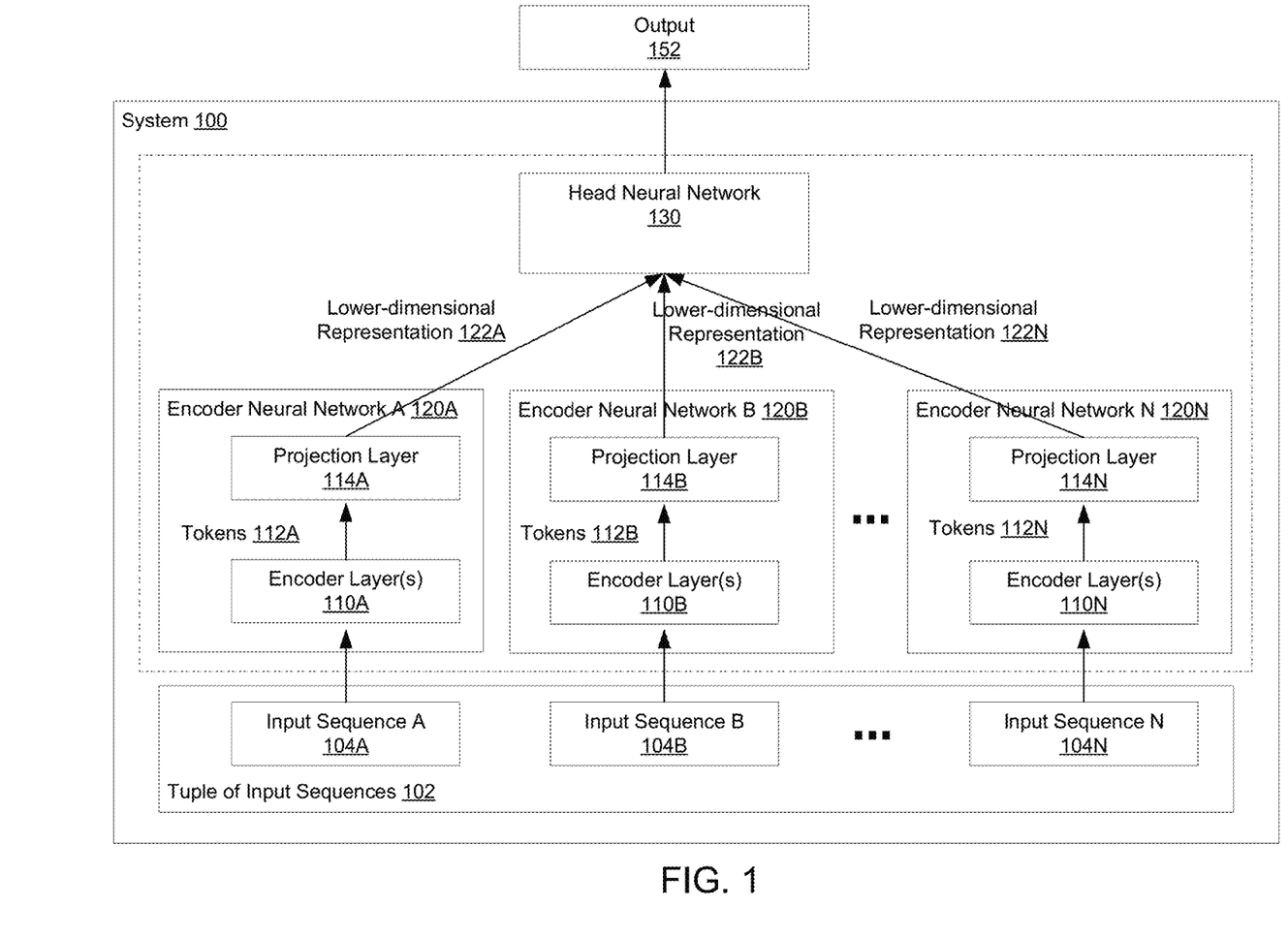
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 can receive a tuple of input sequences 102 and perform a machine learning task on the tuple of input sequences 102 to generate an output 152 for the machine learning task.

As used herein, a tuple refers to a data structure having an ordered set of two or more data elements, e.g., two or more input sequences. An n-tuple refers to a tuple having n ordered elements. For example, a 3-tuple would include 3 elements (e.g., input sequence A, input sequence B, input sequence C) in an order<input sequence A, input sequence B, input sequence C>that is different than a 3-tuple consisting of <input sequence C, input sequence A, input sequence B>.

The neural network system 100 includes a plurality of encoder neural networks 120A-N that are each configured to process an input sequence from the tuple 102, e.g., input sequence A 104A, to generate a lower-dimensional representation, e.g., lower-dimensional representation 122A, of the input sequence and a head neural network 130 that is configured to generate the output 152 from the lower-dimensional representations 122A-N.

As used herein, a lower-dimensional representation can be an encoded representation of an input sequence, i.e., in the form of an ordered collection of data values such as numerical values, that has a lower dimensionality than that of the data structure used to represent the input sequence.

For example, the lower-dimensional representation can be a vector or a matrix of fixed size.

To generate the lower-dimensional representation of the input sequence, each encoder neural network 120A-N can include multiple encoder layers followed by a projection layer. For example, the encoder neural network A 120A can include a stack of multiple encoder layers 110A arranged in a predetermined order, followed by a projection layer 114A arranged atop the stack of the multiple encoder layers 110A.

Example configurations of the encoder layers will be described in more detail below, but typically, each of some or all of the encoder layers included in the encoder neural network can operate on a respective input sequence that includes a respective network input (e.g., in the form of a vector) at each of one or more positions in an input order.

At a high level, at each encoder neural network, e.g., encoder neural network A 120A, the neural network system 100 uses the encoder layers included in the encoder neural network, e.g., encoder layers 110A, to process an input sequence, e.g., input sequence A 104A, data derived from the input sequence, or both to generate an encoded representation of the input sequence. The encoded representation has a sequence of multiple tokens, e.g., tokens 112A. For example, the neural network system 100 can use the encoder network layers 110A to generate a corresponding token for each network input in the input sequence 104A. Typically, the encoded representation is the output of the last encoder layer prior to the projection layer or a combination of the outputs of multiple encoder layers.

As used herein, a token refers to a portion of the encoded representation which, as described above, can be in the form of an ordered collection of numerical values. For example, each token can include one or more numerical values. Each token can be of substantially similar length to one another.

The neural network system 100 then uses the projection layer, e.g., projection layer 114A, to project the sequence of tokens into a lower-dimensional space, i.e., to generate the lower-dimensional representation, e.g., lower-dimensional representation 122A, of the sequence of tokens, e.g., tokens 112A, e.g., by applying a predetermined linear transformation.

In some implementations, the neural network system 100 uses a truncation technique to generate the lower-dimensional representations. That is, instead of projecting the entire sequences of tokens into the lower-dimensional space, the system 100 first determines a selected portion of each encoded representation generated by corresponding stacks of encoder layers 110A-N, and then provides only the selected tokens from the encoded representations to the projection layers 114A-N. Correspondingly, the neural network system 100 projects, i.e., by using the projection layers 114A-N, the selected smaller subsets of tokens into the lower-dimensional space. This can decrease runtime latency of the neural network system 100 for performing the given machine learning task, because the amount of information (i.e., in terms of input sequence length) to be consumed and processed by the head neural network 130 is reduced and thus the time complexity of the head neural network 130 is reduced.

When represented in the form of a data structure of fixed size, e.g., a vector, the selected portion of each encoded representation can include the N first (or last) tokens of the sequence of tokens generated by the encoder layers, where N is a configurable parameter of the neural network system 100. N can be a positive integer the exact value of which may vary between different encoder neural networks 120A-N. For example, the parameter can be a tunable parameter that can be specified, e.g., from a user of the system, e.g., using an application programming interface (API) made available by the system 100. As another example, the parameter can be a dynamic parameter the value of which is determined by the system from the lengths of the input sequences while performing the given machine learning task.

In some implementations, each encoder neural network 120A-N includes one or more attention layers. That is, the multiple encoder network layers, e.g., encoder layers 110A, include at least one attention layer that is configured to receive an input sequence for the layer comprising a respective layer input at each of one or more positions, and thereafter generate an attended input sequence at least in part by applying an attention mechanism to the input sequence for the layer. The attended input sequence includes a respective attended layer input at each of the one or more positions.

In some such implementations, each encoder neural network 120A-N also includes other layers, e.g., fully-connected layers, embedding layers, and activation layers, either in place of or in addition to the attention layers.

In some such implementations, the encoder network layers are the layers of a self-attention neural network. Examples of configurations of self-attention neural networks and the specifics of the other components of self-attention neural networks, e.g., embedding layers that embed inputs to the encoder and the decoder, the feed-forward layers within the layers of the attention network, and the output layers of the attention neural network that generate the network outputs, are described in more detail in Vaswani, et al, Attention Is All You Need, arXiv:1706.03762, Raffel, et al, and Devlin et al, BERT: Pre-training of Deep Bidirectional Transformers for Language Understanding, arXiv: 1810.04805, the entire contents of which are hereby incorporated by reference herein in their entirety.

In the example of FIG. 1, the neural network system 100 includes a plurality of encoder neural networks, e.g., encoder neural networks 120A-N, each configured to process a respective input sequence, e.g., input sequence 104A-N. However, the encoder neural networks need not have a one-to-one correspondence with the input sequences and there may be a different number of encoder neural networks. For example, the system 100 may use the same encoder neural network to process different input sequences from the same received tuple 102 to generate different lower-dimensional representations, and thus there may be a smaller number of encoder neural networks than that of input sequences included in the tuple. In addition, each encoder neural network may have a different network architecture than one another. For example, the encoder neural networks may include different numbers of encoder layers, encoder layers with different configurations, or both.

By generating lower-dimensional representations 122A-N as described above, the neural network system 100 allows the head neural network 130 to generate the output 152 for the given machine learning task by processing a much more compact (and therefore, more data-efficient) representation of the tuple of input sequences 102 with minimum loss of representational capacity of the information contained within the original tuple 102. The neural network system 100 can thus operate in a scalable manner to determine an output 152 from a tuple 102 of a substantially large number of input sequences 104A-N. For example, the tuple can include multiple input sequences representing billions and, possibly, trillions of documents, web pages, or other structured text content, and the output can be an answer string to a user-specified question that is determined by the system from the context of the documents or web pages.

The neural network system 100 then uses the head neural network 130 to generate the output 152 from the lower-dimensional representations 122A-N generated by the encoder neural networks 120A-N. For example, the head neural network 130 can be configured to receive as input a combination, e.g., a vector concatenation, of the lower-dimensional representations 122A-N and to process the combined input using the head neural network 130 to generate the output 152.

As similarly described above, the head neural network 130 can include any of a variety of types of neural network layers that are suitable for the given machine learning task, including, for example, one or more fully-connected layers, one or more attention layers, and/or one or more embedding layers. In the case of multiple layers, they may be stacked, so as to pass data successively between them in a certain layer order. The head neural network 130 also includes an output layer that is configured to receive the data generated by one or more preceding layers and to generate the output 152, e.g., by applying a transformation to the received data to generate a regression or classification output that includes a respective score for each of some or all of the input sequences in the tuple, e.g., with each score for an input sequence representing a relevance measure or a likelihood of being relevant with respect to another input sequence in the tuple.

Figure 2:
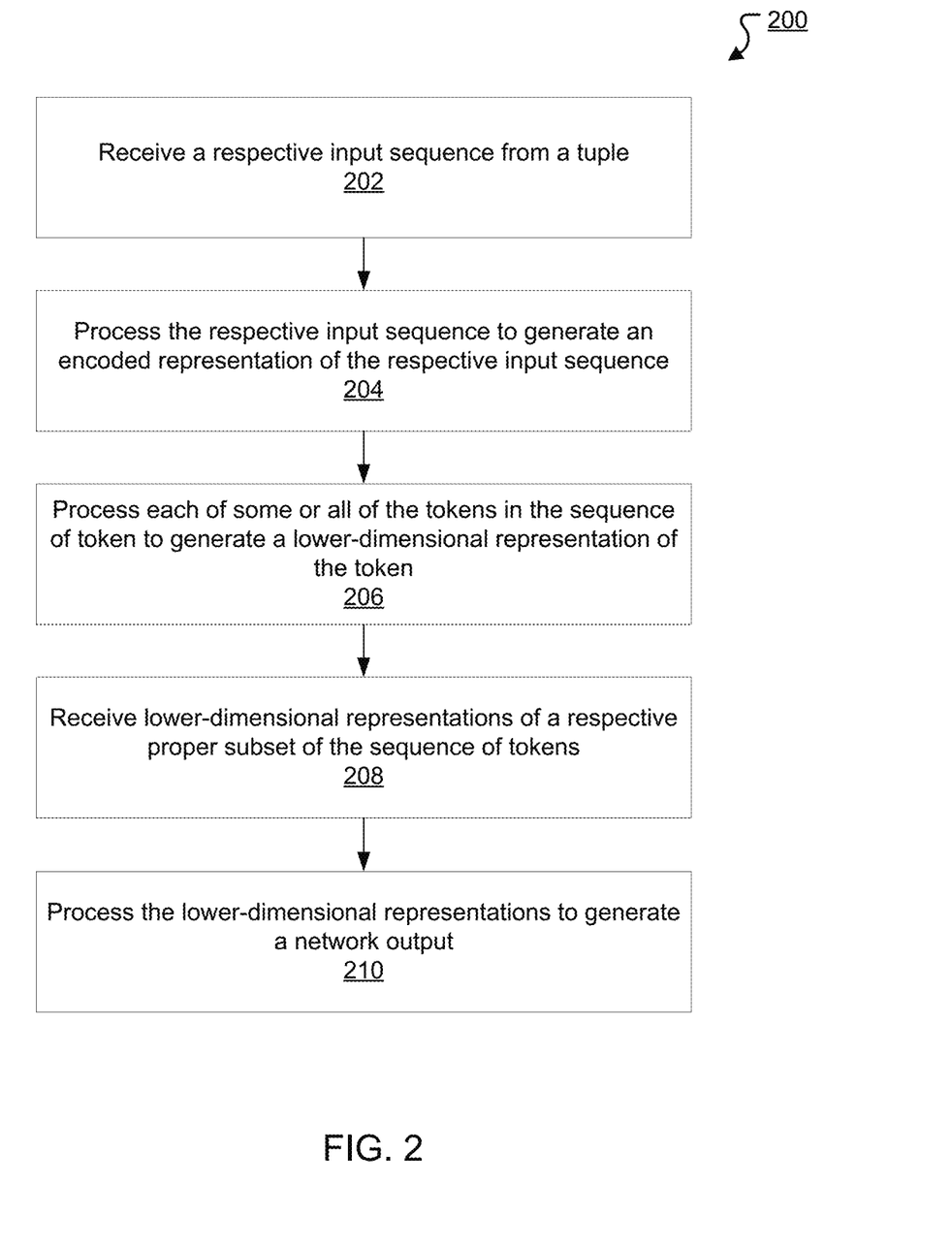
FIG. 2 is a flow diagram of an example process for processing a tuple of input sequences to generate an output.

FIG. 2 is a flow diagram of an example process 200 for processing a tuple of input sequences to generate an output. For convenience, the process 200 will be described as being performed by a system of one or more computers located in one or more locations. For example, a neural network system, e.g., neural network system 100 of FIG. 1, appropriately programmed in accordance with this specification, can perform the process 200.

The system receives, at each of a plurality of encoder neural networks, a respective input sequence from a tuple of respective input sequences (202). Each input sequence includes a respective network input at each of multiple positions in an input order. The lengths, i.e., numbers of network inputs, of different input sequences within a same tuple may vary from one another.

The system processes, using one or more encoder layers of each of the plurality of encoder neural networks, the respective input sequence to generate an encoded representation of the respective input sequence (204). Generally, the encoded representation can be a sequence of the multiple tokens that is represented, for example, as a vector or other ordered collection of multiple numeric values, where each token can include one or more numerical values.

In the case of the encoder neural network including multiple encoder layers, they may be stacked, so as to perform successive operations on the respective input sequence to generate the encoded representation, i.e., in accordance with the configurations and associated parameter values of the encoder layers.

In some implementations, the plurality of encoder neural networks can have the same architecture. That is, the configurations of and connections between the encoder layers within each encoder neural network are the same across all encoder neural networks. In other implementations, different encoder neural networks can have encoder layers that are of different configurations, different connections, or both. In addition, different encoder neural networks can have different numbers of encoder layers. In either implementation, the values of the parameters associated with the encoder layers, which may be learned by the system during training, are typically different across different encoder neural networks.

In some implementations, the encoder layers of encoder neural networks include at least one attention layer and, optionally, one feed-forward layer. The attention layer is configured to receive an input sequence for the layer comprising a respective layer input at each of one or more positions, and thereafter generate an attended input sequence at least in part by applying an attention mechanism, e.g., a self-attention mechanism, e.g., a multi-head self-attention mechanism, to the input sequence for the layer. The attended input sequence includes a respective attended layer input at each of the one or more positions. The feed-forward layer, when included, then operates on the attended input sequence to generate an output sequence for the layer, from which the encoded representation may be determined or otherwise derived.

The system processes, using a projection layer of each of the plurality of encoder neural networks, each of some or all of the tokens in the sequence of tokens to generate a lower-dimensional representation of the token (206). For example, the projection layer can apply a predetermined linear transformation to a token in order to project the token into a lower-dimensional space.

In some implementations, the system can generate the lower-dimensional representations of the input sequences by using the projection layer of each encoder neural network to project all of the tokens included in the encoded representations of the input sequences into the lower-dimensional space.

In other implementations, especially those that involve operating on long-length input sequences, the system can instead select a proper subset of tokens included in each encoded representation and thereafter use the projection layers to project the selected proper subsets of the tokens to generate the lower-dimensional representations of the input sequences. In other words, the system makes a respective determination of which proper subset to select for each of the tokens in the encoded representation and sometimes selects proper subsets of the tokens that are of different sizes from different encoded representations. Correspondingly, the lower-dimensional representations of the subset of tokens generated by different projection layers across different encoder neural networks can have different dimensions from one another.

In these implementations, the proper subsets of tokens may be selected in any of a variety of ways.

Figure 3:
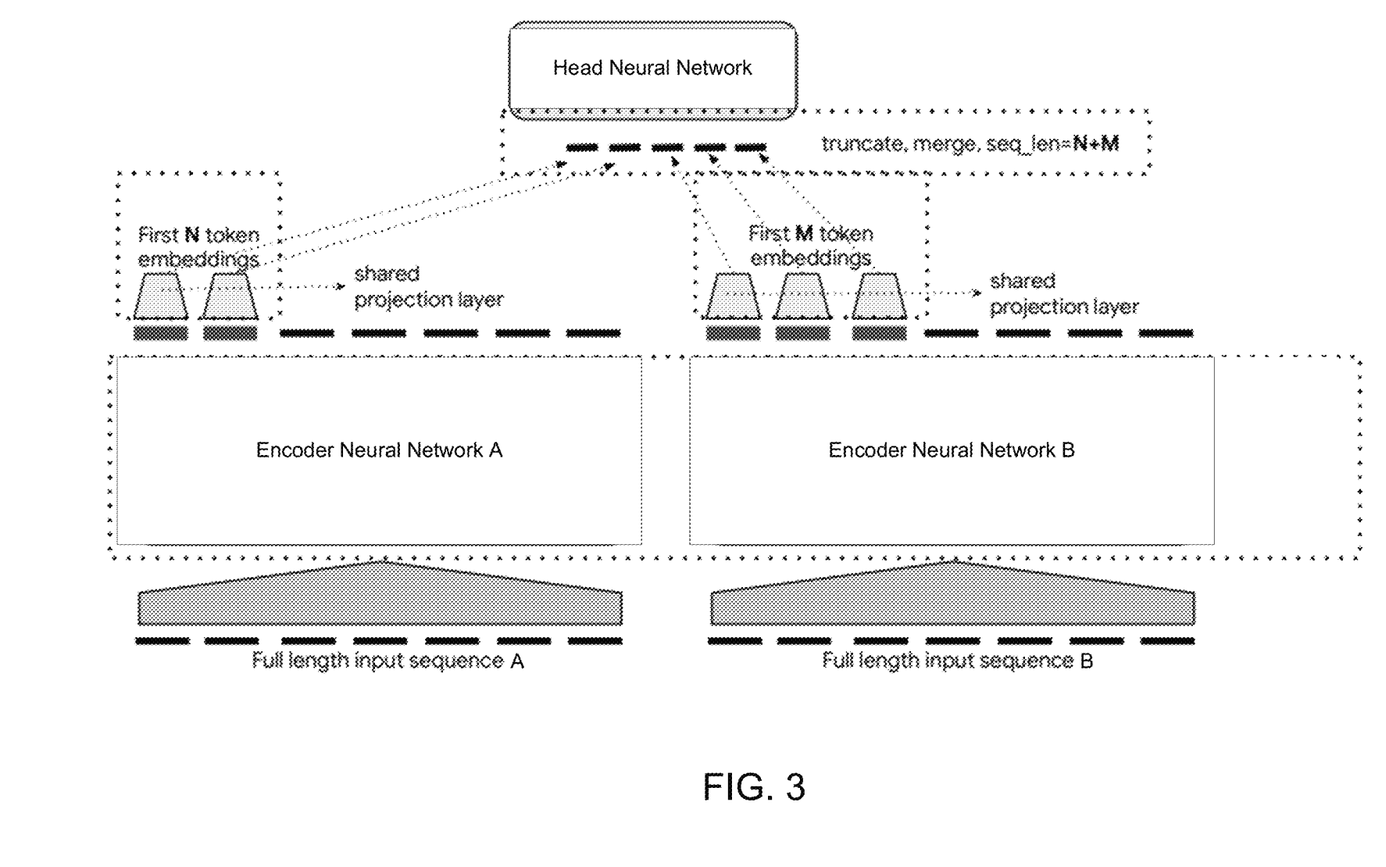
FIG. 3 is an illustration of selecting tokens from encoded representations of input sequences.

FIG. 3 is an illustration of selecting tokens from encoded representations of input sequences. In the example of FIG. 3, for each sequence of tokens generated by the one or more encoder network layers of the encoder neural network from the input sequence, the system can determine a respective proper subset of the sequence of tokens based on respective positions of the tokens in the sequence, for example selecting the first few tokens or the last few tokens from a sequence of tokens. The system can also determine a respective proper subset of the sequence of tokens based on a length of the input sequence, for example selecting more tokens from encoded representations generated from longer input sequences. As a particular example, the system can select the first N or last N tokens, where N is a fixed fraction of the total number of tokens in the sequence.

As depicted in FIG. 3, for encoder neural network A, the system selects N=2 leftmost tokens in the sequence of tokens generated by the encoder neural network A from processing input sequence A. For encoder neural network B, the system selects M=3 leftmost tokens in the sequence of tokens generated by the encoder neural network B from processing input sequence B.

The system receives, at a head neural network and from each of the plurality of encoder neural networks, lower-dimensional representations of a respective proper subset of the sequence of tokens generated by the encoder neural network (208).

In some implementations, the encoder neural networks and the head neural network share access to the same memory or a data storage that is accessible to the system. In these implementations, the system can store the lower-dimensional representations of the respective proper subsets of the sequences of tokens generated by the encoder neural networks in memory or data storage accessible to the head neural network, e.g., in addition to or instead of directly providing these representations to the head neural network, e.g., through a wired or wireless network. The system can then retrieve these representations whenever an output needs to be generated by using the head neural network based on processing some or all of these stored, i.e., pre-computed, representations.

In various cases, this can allow for the system to perform a given machine learning task with reduced inference time. In addition, this can be further advantageous in cases where there are more possible combinations than the number of distinct input sequences, because a lower-dimensional representation for the same input sequence need not be regenerated as the system processes different tuples of input sequences. As a concrete example, the given task is to predict the relevance between a query and a document. The system can generate and store, e.g., prior to receiving a user input to begin performing the task, respective lower-dimensional representations for all available input sequences to the system which may include millions of queries and millions of documents and, when at inference time, use the lightweight head neural network to efficiently process different pairs of pre-stored lower-dimensional representations to generate as output a relevance score for each different query-document pair.

The system processes, using the head neural network, the lower-dimensional representations to generate an output (210). Specifically, the system can generate a combined, e.g., concatenated, input for the head neural network from the lower-dimensional representations of the respective small proper subsets of tokens that have been generated as a result of processing the input sequences using the encoder neural networks. The system then uses the head neural network to process the combined input to generate the network output. Depending on the specifics of the given machine learning task, the output can be any kind of score, classification, or regression output based on the tuple of input sequences.

In general, the process 200 can be performed as part of predicting an output for a tuple of multiple input sequences for which the desired output, i.e., the output that should be generated by the system for the tuple of multiple input sequences, is not known.

The process 200 can also be performed as part of processing tuples of input sequences derived from a set of training data, i.e., tuples of input sequences derived from a set of inputs for which the output that should be generated by the system is known, in order to train the encoder neural networks and the head neural network to determine trained values for the parameters of the neural networks, so that the system can summarize the information of the entire input sequence to selected tokens of the encoded representations of the input sequence and generate accurate output scores. Specifically, the system can do this by optimizing an objective function that is specific to the given machine learning task. The exact forms of the objective function may vary across different tasks, but typically, the objective function measures a difference between the predicted output and the known, desired output or another target output that is derived from the known, desired output. A cross-entropy loss function, e.g., in the case of classification tasks, and a mean squared error (MSE) loss function, e.g., in the case of regression tasks, are examples of suitable objective functions that can be used by the system during the training.

The system can repeatedly perform the process 200 on inputs selected from a set of training data as part of a conventional machine learning training technique to train the initial neural network layers, e.g., a gradient descent with backpropagation training technique that uses a conventional optimizer, e.g., stochastic gradient descent, RMSprop, or Adam optimizer, including Adam with weight decay ("AdamW") optimizer. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the encoder neural networks in parallel.

In some implementations, prior to the commencement of the training, the system can initialize a portion of the parameters of the encoder neural networks in accordance with a predetermined set of parameter values, rather than randomly initialized values. This can improve the overall training effectiveness in terms of required computational resources. For example, the system can initialize parameter values of the one or more encoder network layers of each encoder neural network with trained values of parameters of another, pre-trained neural network. For example, the other neural network can be a self-attention neural network that has already been trained to attain at least a threshold level of performance (e.g., accuracy) on a relevant machine learning task, e.g., a natural language processing or understanding task that involves operating on textual data, information derived from textual data, or both.

That is, the system can obtain an instance of the neural network by first instantiating the encoder neural networks according to the architecture and trained parameter values of (a portion of) the other self-attention neural network, and then attaching the projection layers and the head neural network to the encoder network layers included in the encoder neural networks that have been instantiated in this way. The system can then proceed to train the obtained neural network on the given machine learning task as described above.

In some implementations, the system makes use of a teacher neural network during the training. For example, the teacher neural network can be a specialist neural network with a cumbersome architecture (e.g., with more layers, more parameters, or both) that has already been trained to attain at least a threshold level of performance on the same given machine learning task as the system is configured to perform. Specifically, for each training input (i.e., a training tuple of input sequences), the system first processes the training input using a trained neural network to generate a teacher network output, and then trains the encoder and head neural networks using the teacher network output generated by the teacher neural network, i.e., trains the head neural network to generate a training output for the training input that match the teacher network output.

For example, the system can do this by optimizing a cross-entropy loss function:

$$-\sum_{i}(y_i \log p_i + (1 - y_i)\log(1 - p_i)),$$

where $y_i$ is the training output generated by the neural network and $p_i$ may be computed by applying a sigmoid function on the teacher network output which is in the form of logits.

This can further improve the effectiveness of training by allowing for the system to make use of unlabeled training data, which is typically much more readily available in large amounts, compared with labeled (e.g., human-annotated) training data. In addition, once trained using the cumbersome teacher neural network, the neural networks can generate outputs that are not significantly less accurate than outputs generated by the cumbersome neural network despite being easier to deploy or using fewer computational resources than the cumbersome neural network. In some implementations, the system trains the neural networks using a two-stage process. During the first ("pre-training") stage, the system adjusts only parameter values of the projection layers of the encoder neural networks and parameter values of the head neural network, while keeping the parameter values of the one or more encoder network layers fixed to their values that have been randomly initialized or otherwise predetermined. After the pre-training, that is, during the second ("fine-tuning") stage, the system adjusts values of all of the network parameters, including parameter values of the one or more encoder network layers of the encoder neural networks.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for performing a machine learning task on a tuple of a plurality of input sequences to generate an output, the system comprising one or more computers and one or more storage devices storing instructions that, when executed by the one or more computers, cause the one or more computers to perform one or more operations to implement:
   a neural network configured to perform the machine learning task, the neural network comprising (i) a plurality of encoder neural networks that comprise a different encoder neural network corresponding to each different input sequence included in the tuple and (ii) a head neural network, wherein each encoder neural network comprises one or more encoder network layers and a projection layer, wherein each encoder neural network is configured to:
    receive an input sequence that corresponds to the encoder neural network from the tuple, wherein the input sequence has a respective network input at each of a plurality of input positions in an input order;
    process the input sequence using the one or more encoder network layers to generate an encoded representation of the respective input sequence, the encoded representation comprising a sequence of tokens;
    determine a respective proper subset of the sequence of tokens in the encoded representation based on respective positions of the tokens in the sequence and a length of the input sequence that corresponds to the encoder neural network; and
    process each token in the respective proper subset using the projection layer to generate a lower-dimensional representation of the token, and wherein the head neural network is configured to:
    receive, from each of the plurality of encoder neural networks, the lower-dimensional representation of each token in the respective proper subset that is generated by the encoder neural network; and
    process the lower-dimensional representations to generate the output.

2. The system of claim 1, wherein the head neural network is further configured to access the lower-dimensional representations of the respective proper subsets of the sequences of tokens generated by the encoder neural networks from a memory.

3. The system of claim 1, wherein the lower-dimensional representations of the tokens generated by different projection layers have different dimensions from each other.

4. The system of claim 1, wherein the sequence of tokens generated by the encoder neural network comprises a corresponding token for each network input in the input sequence.

5. The system of claim 1, wherein the respective proper subset of the sequence of tokens comprises first N tokens in the sequence of tokens, and wherein N is a predetermined positive integer.

6. The system of claim 1, wherein the machine learning task is a semantic text matching task.

7. The system of claim 1, wherein the one or more encoder network layers comprise an attention layer that is configured to:
    receive an input sequence for the layer comprising a respective layer input at each of one or more positions; and
    generate an attended input sequence at least in part by applying an attention mechanism to the input sequence for the layer, the attended input sequence comprising a respective attended layer input at each of the one or more positions.

8. The system of claim 1, wherein the respective proper subsets of the sequences of tokens for different input sequences included in the tuple have different numbers of tokens than each other.

9. A computer-implemented method comprising:
    receiving, by a neural network, a tuple of a plurality of input sequences, wherein the neural network comprises:
        (i) a plurality of encoder neural networks that comprise a different encoder neural network corresponding to each different input sequence included in the tuple and
        (ii) a head neural network, wherein each encoder neural network comprises one or more encoder network layers and a projection layer;
    receiving, at each encoder neural network, an input sequence that corresponds to the encoder neural network from the tuple, wherein the input sequence has a respective network input at each of a plurality of input positions in an input order;
    processing, using the one or more encoder network layers of each encoder neural network, the input sequence to generate an encoded representation of the input sequence, the encoded representation comprising a sequence of tokens;
    determining a respective proper subset of the sequence of tokens in the encoded representation based on respective positions of the tokens in the sequence and a length of the input sequence that corresponds to the encoder neural network;
    processing, using the projection layer of each encoder neural network, each token in the respective proper subset to generate a lower-dimensional representation of the token;
    receiving, at the head neural network and from each of the plurality of encoder neural networks, the lower-dimensional representation of each token in the respective proper subset that is generated by the encoder neural network; and
    processing, using the head neural network, the lower-dimensional representations to generate an output.

10. The computer-implemented method of claim 9, wherein the head neural network is further configured to access the lower-dimensional representations of the respective proper subsets of the sequences of tokens generated by the encoder neural networks from a memory.

11. The computer-implemented method of claim 9, wherein the lower-dimensional representations of the tokens generated by different projection layers have different dimensions from each other.

12. The computer-implemented method of claim 9, wherein the sequence of tokens generated by the encoder neural network comprises a corresponding token for each network input in the input sequence.

13. The computer-implemented method of claim 9, wherein the respective proper subset of the sequence of tokens comprises first N tokens in the sequence of tokens, and wherein N is a predetermined positive integer.

14. The computer-implemented method of claim 9, wherein the one or more encoder network layers comprise an attention layer that is configured to:
    receive an input sequence for the layer comprising a respective layer input at each of one or more positions; and
    generate an attended input sequence at least in part by applying an attention mechanism to the input sequence for the layer, the attended input sequence comprising a respective attended layer input at each of the one or more positions.

15. The computer-implemented method of claim 9, further comprising training the plurality of encoder neural networks and the head neural network including initializing parameter values of the one or more encoder network layers of each encoder neural network with a predetermined set of parameter values.

16. The computer-implemented method of claim 15, wherein the training further comprises:
    receiving a training tuple;

processing the training tuple using a trained neural network to generate a teacher network output; and training the neural network using the teacher network output generated by the trained neural network, wherein the training comprises adjusting only parameter values of the projection layers of the encoder neural networks and parameter values of the head neural network.

17. The computer-implemented method of claim 16, wherein the training further comprises:

receiving another training tuple;

processing the training tuple using the trained neural network to generate another teacher network output; and training the neural network using the other teacher network output generated by the trained neural network, including adjusting parameter values of the one or more encoder network layers of the encoder neural networks.

18. The computer-implemented method of claim 9, wherein the respective proper subsets of the sequences of tokens for different input sequences included in the tuple have different numbers of tokens than each other.

19. One or more non-transitory computer storage media storing instructions that when executed by one or more computers cause the one or more computers to implement:

a neural network configured to perform a machine learning task on a tuple of a plurality of input sequences to generate a network output, the neural network comprising (i) a plurality of encoder neural networks that comprise a different encoder neural network corresponding to each different input sequence included in the tuple and (ii) a head neural network, wherein each encoder neural network comprises one or more encoder network layers and a projection layer, wherein each encoder neural network is configured to:

receive an input sequence that corresponds to the encoder neural network from the tuple, wherein the input sequence has a respective network input at each of a plurality of input positions in an input order;

process the input sequence using the one or more encoder network layers to generate an encoded representation of the respective input sequence, the encoded representation comprising a sequence of tokens;

determine a respective proper subset of the sequence of tokens in the encoded representation based on respective positions of the tokens in the sequence and a length of the input sequence that corresponds to the encoder neural network; and process each token in the respective proper subset using the projection layer to generate a lower-dimensional representation of the token, and wherein the head neural network is configured to:

receive, from each of the plurality of encoder neural networks, the lower-dimensional representation of each token in the respective proper subset that is generated by the encoder neural network; and process the lower-dimensional representations to generate the output.

20. The one or more non-transitory computer storage media of claim 19, wherein the respective proper subsets of the sequences of tokens for different input sequences included in the tuple have different numbers of tokens than each other.

* * * * *